United States Patent
Hoole et al.

(10) Patent No.: US 12,259,983 B2
(45) Date of Patent: Mar. 25, 2025

(54) SENSITIVE INFORMATION DISCOVERY AND TEST COMPONENT CONFIGURATION

(71) Applicant: MICRO FOCUS LLC, Santa Clara, CA (US)

(72) Inventors: Alexander Hoole, Santa Clara, CA (US); Ali ElKortobi, Spring Branch, TX (US); Reiner Kappenberger, Groveland, CA (US); Domingo Juan Rivera, Holly Springs, NC (US)

(73) Assignee: Micro Focus LLC, Santa Clara, CA (US)

( * ) Notice: Subject to any disclaimer, the term of this patent is extended or adjusted under 35 U.S.C. 154(b) by 407 days.

(21) Appl. No.: 17/702,680

(22) Filed: Mar. 23, 2022

(65) Prior Publication Data

US 2023/0306122 A1 Sep. 28, 2023

(51) Int. Cl.
*G06F 21/00* (2013.01)
*G06F 11/3668* (2025.01)
*G06F 21/60* (2013.01)

(52) U.S. Cl.
CPC ........ *G06F 21/604* (2013.01); *G06F 11/3688* (2013.01)

(58) Field of Classification Search
CPC .......................... G06F 21/604; G06F 11/3688
See application file for complete search history.

(56) References Cited

U.S. PATENT DOCUMENTS

| | | | |
|---|---|---|---|
| 8,726,392 B1 | 5/2014 | Mccorkendale | |
| 9,721,106 B2 | 8/2017 | Gianoulakis | |
| 10,565,377 B1* | 2/2020 | Zheng | G06F 21/56 |
| 11,275,661 B1* | 3/2022 | Vantrease | G06N 3/08 |
| 2010/0125891 A1 | 5/2010 | Baskaran | |
| 2014/0020093 A1* | 1/2014 | Scholte | H04L 63/123 |
| | | | 726/22 |
| 2015/0143524 A1* | 5/2015 | Chestna | G06F 8/30 |
| | | | 726/25 |
| 2016/0105351 A1* | 4/2016 | Slivkins | H04L 67/535 |
| | | | 709/224 |
| 2017/0220458 A1* | 8/2017 | Finger | G06F 11/3688 |
| 2017/0220804 A1* | 8/2017 | Muthurajan | G06F 21/577 |
| 2018/0101473 A1* | 4/2018 | Slivkins | G06T 11/206 |
| 2020/0327252 A1* | 10/2020 | Mcfall | G06F 21/78 |
| 2021/0034754 A1* | 2/2021 | Xiang | G06F 11/3688 |
| 2021/0232377 A1* | 7/2021 | Bae | G06F 21/577 |
| 2021/0334384 A1* | 10/2021 | Ranjan | G06F 21/6227 |
| 2022/0075710 A1* | 3/2022 | Glowa | G06F 11/3684 |

* cited by examiner

*Primary Examiner* — Shin-Hon (Eric) Chen
(74) *Attorney, Agent, or Firm* — Sheridan Ross P.C.

(57) ABSTRACT

Testing software applications often requires a balancing of thoroughness versus the time and computing resources available to perform such tests. Certain data handling operations may potentially expose data to unauthorized parties. However, not all data is equal; some data requires a greater degree of protection than other data, which may be based on a security context (e.g., rule, law, policy, etc.). By generating rules determined by a particular context, extraneous tests on data outside of the context, may be omitted. Unnecessary tests may be omitted and the results of each analysis process correlated to identify actual vulnerabilities and omit false positives, such as vulnerabilities to data that does not require the same degree of care to avoid unauthorized exposure.

20 Claims, 4 Drawing Sheets

SENSITIVE INFORMATION DISCOVERY AND TEST COMPONENT CONFIGURATION

FIELD OF THE DISCLOSURE

The invention relates generally to systems and methods for testing an application under test and particularly to automatically configuring a testing component with rules based on a testing context.

BACKGROUND

Governing bodies, governmental agencies, and corporations enact laws, regulations, and other requirements restricting the use of defined types of information, e.g., personally identifiable information (PII), classified, confidential, sensitive information, etc. Historically, it has been possible to identify in code the direct use of hardcoded values which resemble personally identifiable information, such as credit-card numbers and the like. However, when data is retrieved from a storage mechanism, such as a database, file, or in-memory system, the semantic knowledge of whether or not the retrieved data represents sensitive information is unknown. As a result, sensitive data may be erroneously considered as non-sensitive and, when treated as such, be at risk of exposure to an unauthorized device or user.

SUMMARY

The prior art fails to provide for more complete scans of software code, data structures, and applications to detect usage violations of sensitive data and to secure sensitive data for compliance with privacy laws and regulations. For example, Static Code Analysis (SCA) is capable of, and well-suited for, tracking where "tainted" data enters a program and identifying where it can leak from the system via dataflow analysis. Unfortunately, one of the more challenging deficiencies in SCA is its inability to understand context and semantics of an application. Specifically, prior art SCA is not capable of knowing if a read operation on a file, database, or other source of data contains sensitive information, nor does SCA understand what type of sensitive information is present.

These and other needs are addressed by the various embodiments and configurations of the present invention. The present invention can provide a number of advantages depending on the particular configuration. These and other advantages will be apparent from the disclosure of the invention(s) contained herein.

For a selected context (e.g., a selected set of laws, regulations, or rules identifying sensitive data), semantically relevant scanning rules are generated from the results of a structured and/or unstructured data analysis. The data may be persistent, transitive, or actively in use. Such data analysis may consist of approaches including regular expression, dictionary matching, and other heuristic algorithms that uniquely identify locations where data that violates the selected context occurs. The set of generated rules are then used to scan code to understand context and semantics of an application and to provide an output, or filtered sensitive results, comprising of a list of potential violations. Scanning can be performed with either a static or dynamic analysis approach, such as static code analysis or runtime instrumentation analysis.

Generating semantically relevant scanning rules from the results of structured and/or unstructured data analysis provides the source code analyzer or runtime analyzer with context and semantics of an application. Specifically, not only can the code analysis know if an XML, JSON, or SV formatted file, database, or other source of data contains sensitive information, but also determine what type of sensitive information is present. The invention is particularly applicable to databases, such as Oracle, SQL server, Sybase, and DB2 along with JDBC.

For a defined or determined context, a rule generator generates (based on restricted information metadata output by an existing structured, or unstructured, data analysis scanner (e.g. Structured Data Manager (SDM)) a set of semantically relevant scanning rules that identify contextual and/or semantic violations of the context. There can be single or multiple contexts and single or multiple corresponding sets of scanning rules generated from the restricted information metadata that are sequentially applied to scan a given application, or set of applications. A processor using static or other code analysis scans the application code (i.e., source files of the application) based on the scanning rules (e.g., default rules, generated rules, voltage rules, and other rules) to determine how restricted information is used by the scanned application and accessed by users, and to identify potential use and access violations (or security relevant indicators) for the restricted information. For example, the scanning rules can identify: where purpose-determined APIs are in use, if such APIs are used correctly, the use of structured data that consumes sensitive information, when sensitive data is protected, when sensitive data becomes unprotected, and when sensitive information from identified sources is leaked to unprotected locations. The output, or filtered sensitive results, is a list of potential violations.

In one embodiment, a system for automatically training a security analysis component to evaluate an application under test (AUT) for compliance with a security context disclosed, comprising: at least one processor of a number of processors that accesses instructions maintained in a non-transitory memory, that, when executed by the at least one processor of the number of processors processor, cause the at least one processor of the number of processors to: access a security context defining protected data, the protected data comprising one or more datum of a set of data; generate a set of rules defining risks to the protected data, wherein the defined risks comprise usages of the protected data; and configure the security analysis component with the rules for testing the AUT for compliance with the security context.

In another embodiment, a computer-based method for automatically training a security analysis component to evaluate an application under test (AUT) for compliance with a security context is disclosed, comprising: accessing a security context defining protected data, the protected data comprising one or more datum of a set of data; generating a set of rules defining risks to the protected data, wherein the defined risks comprise usages of the protected data; and configuring the security analysis component with the rules for testing the AUT for compliance with the security context.

In another embodiment, a system is disclosed, comprising: means to access a security context defining protected data, the protected data comprising one or more datum of a set of data; means to generate a set of rules defining risks to the protected data, wherein the defined risks comprise usages of the protected data, wherein at least one rule of the set of rules defines a risk comprising one or more of reading, writing, or manipulating the protected data and wherein the set of rules define risks to the protected data comprising less than all of the rules applicable to the protected data; and means to configure the security analysis component with the rules for testing an application under test (AUT) for compliance with the security context.

A system on a chip (SoC) including any one or more of the above embodiments or aspects of the embodiments described herein.

One or more means for performing any one or more of the above or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized.

The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference to one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
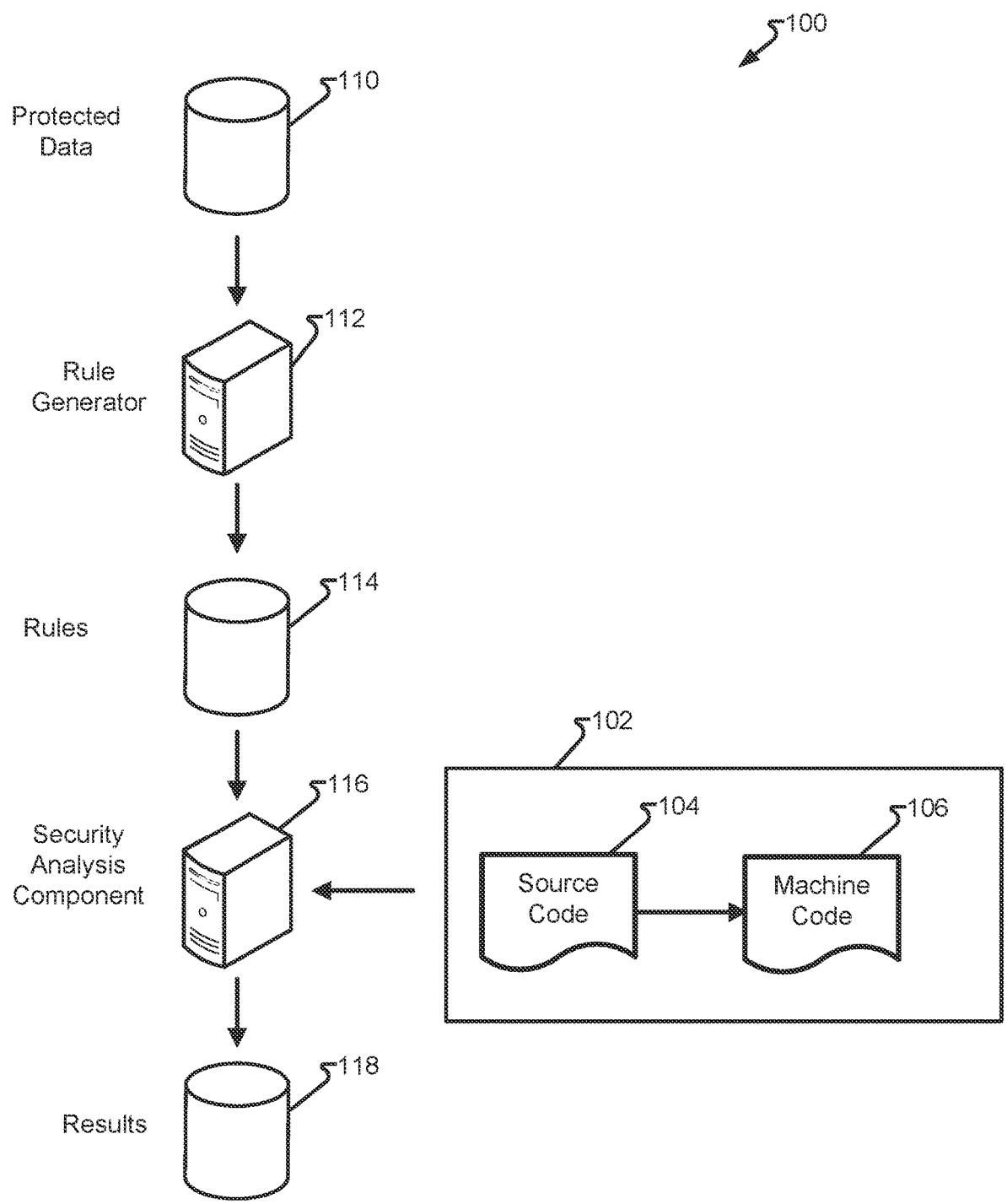
FIG. 1 depicts a system in accordance with embodiments of the present disclosure.

FIG. 1 depicts system 100 in accordance with embodiments of the present disclosure. In one embodiment, protected data is maintained in protected data storage 110. Protected data is determined, at least in part, with respect to a particular security context, as one or more data element to be safeguarded against access by unauthorized persons and components. While it may be desirable to protect all data within protected data storage 110 from unauthorized access, some of the data is mandated by a particular security context. For example, Health Information Portability and Accountability Act (HIPAA) governs health information and which data must be afforded particular protections. The protections applied to data is generally not uniform, for example, handling personally identifiable and health information is mandated to require a high degree of protection, such as to protect an individual's personal health information. However, non-identifiable information, alone or in combination with health information, may be useful for demographic information (e.g., a particular geographic region has a higher occurrence of a particular health issue) without identifying any of the individuals.

Through programming error or by exploiting system vulnerabilities, sensitive data may be either used improperly or, even when used properly, expose the data to potential misuse. For example, sensitive data may be manipulated, such as added to a particular data structure and that data structure wrote to a file. As a result, the data structure, file, and/or location of the file may be identifying as a potential risk. Remediation may include removing the sensitive data from the data structure, if not required, identifying the file and location of the file as being potentially vulnerable to expose the sensitive data, as a further option, additional measures may be deployed to better ensure the file and location are immune, or at least more resistant, to unauthorized access as compared to files and locations that are devoid of any sensitive data.

While it is possible to identify all of the data as being sensitive, such an over inclusive approach produces false positives that waste computational and data storage resources to determine, as well as resources that utilize the findings as feedback into an application under test (AUT) and/or system architecture to implement measures to protect such data. For example, a real estate property tax assessor may maintain records comprising property details and the owner of the property. While some information may be confidential (e.g., bank account utilized to pay property taxes), flooding a system with all data, which may include data publicly available (e.g., a particular property's owner), identified as being sensitive increases the opportunity that real threats to data security will be lost among the "noise" of false positives. Such is especially true if testing of AUTs is time or processing cycle limited. Testing for security on data that is not required to be secure, may cause tests for security on data that does require a greater degree of security to be omitted. Similarly, all rules may be generated for all sensitive data. The set of rules may include flagging any occurrence of any usage of the sensitive data. However, this too may result in an untenable number of false positives. For example, while some usage of sensitive data is meaningful to identify (e.g., writing to a file), other usage may be benign, such as a sorting operation and when such an operation has not been identified as possessing a known security vulnerability.

The context may be determined by law, regulation, and/or any relevant rule governing the data and/or processing of the data. For example, in certain jurisdictions detailed real estate holdings are considered public record and may be provided freely. In other jurisdictions, only general information (e.g., name of owner and address) is publicly available whereas other information (e.g., purchase price, square footage, etc.) are protected to a particular level (e.g., accessible upon payment of a fee). In other jurisdictions, all real estate holdings are considered sensitive information and available only to authorized parties having a legitimate need to know (e.g., code and law enforcement, tax assessor, etc.).

Rule generator 112 utilizes the context and accesses the data in protected data storage 110 to generate rules. The rules may include one or more of identifying when sensitive data is read, manipulated, or wrote to a storage (e.g., memory, port, address, file, database, etc.). Manipulation may include a portion of all available manipulations. For example, sorting social security numbers may not be a manipulation of concern, and as a result no rule generated, but loading a data structure with a social security number may be a concern and a rule generated accordingly to flag such occurrences.

Rules may be maintained in rule data storage 114 and accessed by security analysis component 116 to evaluate application under test (AUT) 102 or, more simply, AUT 102. AUT 102 may comprise AUT source code 104 and/or AUT machine code 106. Security analysis component 116 then evaluates AUT 102 with the rules. Results are then maintained in results data storage 118, which may be a file, data base, memory location, communication buffer, etc.

Figure 2:
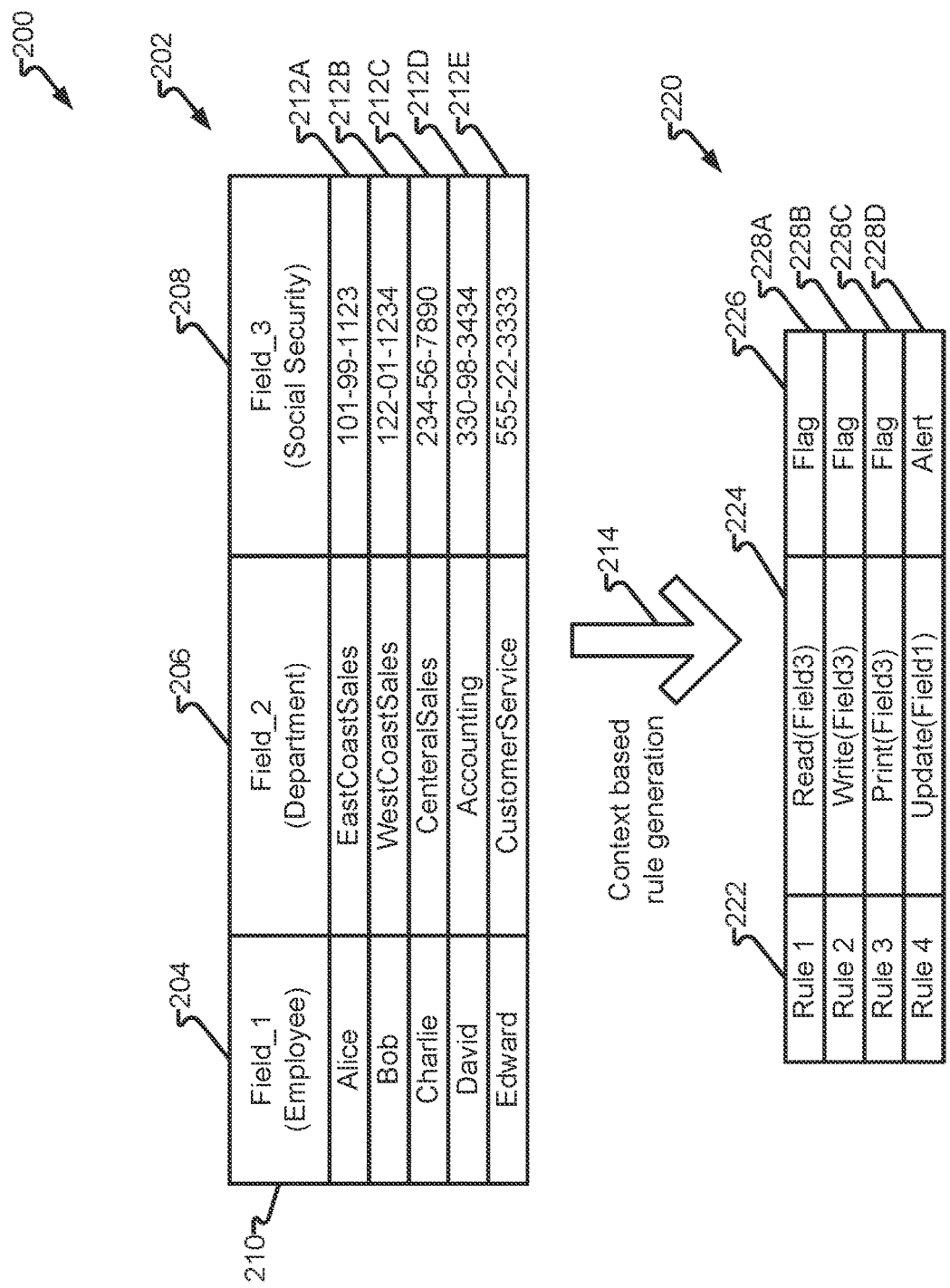
FIG. 2 depicts dynamic rule generation in accordance with embodiments of the present disclosure.

FIG. 2 depicts dynamic rule generation 200 in accordance with embodiments of the present disclosure. In one embodiment, data 202 comprises a file, memory contents, record, etc., having data that, for at least one context, is considered sensitive. data 202 may optionally comprise header 210 (e.g., field identifier, column identifier, etc.), or may be omitted. In one embodiment, data 202 comprises column 204 (e.g., employee name in "Field_1"), column 206 (e.g., department name in "Field_2"), and column 208 (e.g., Social Security number in "Field_3"). A number of records 212A-212E are embodied as rows of data 202.

In another embodiment, rule generator 112, comprising at least one processor, accesses data 202 and a context. The context is utilized to map provided and/or determined datum within data 202 and/or a rule. Rule generator 112 may be provided with indicia that a particular field (e.g., "Field_3" having Social Security Information) is an operation on sensitive data), however, pattern matching, dictionary matching, or other determinative operations may be implemented by rule generator 112. Accordingly, rule generator 112 may be provided with a description of Social Security numbers (e.g., form of "nnn-nn-nnnn", where "n" is a single digit integer only, sufficient match to another data source (not shown) known to comprise Social Security numbers, etc.) and determine that the data in column 204 and column 206 do not match but the data in column 208 does match. As a result, reads of any value in column 208 are deemed sensitive.

Rule generation 214, such as may be performed by rule generator 112, is provided with a context that specifies that Social Security numbers are sensitive and, as a result, operations that are known to exist with AUT source code 104 are then utilized to develop records 228A-228D comprising rules of rules 220. Rules 220 may comprise identifier column 222, specific rule 224, and/or event column 226 determining how to respond when a corresponding rule is evaluated to be true.

Rules 220 may be generated in accordance with groupings of rules. For example, outputting data to a web client may be an issue of concern and packaged as one group of rules. Other groups may include particular categories of rules (e.g., operations that must be performed but have known exploits) and/or custom rules (e.g., a particular operation and/or datum is sensitive data for one customer AUT but not another).

Figure 3:
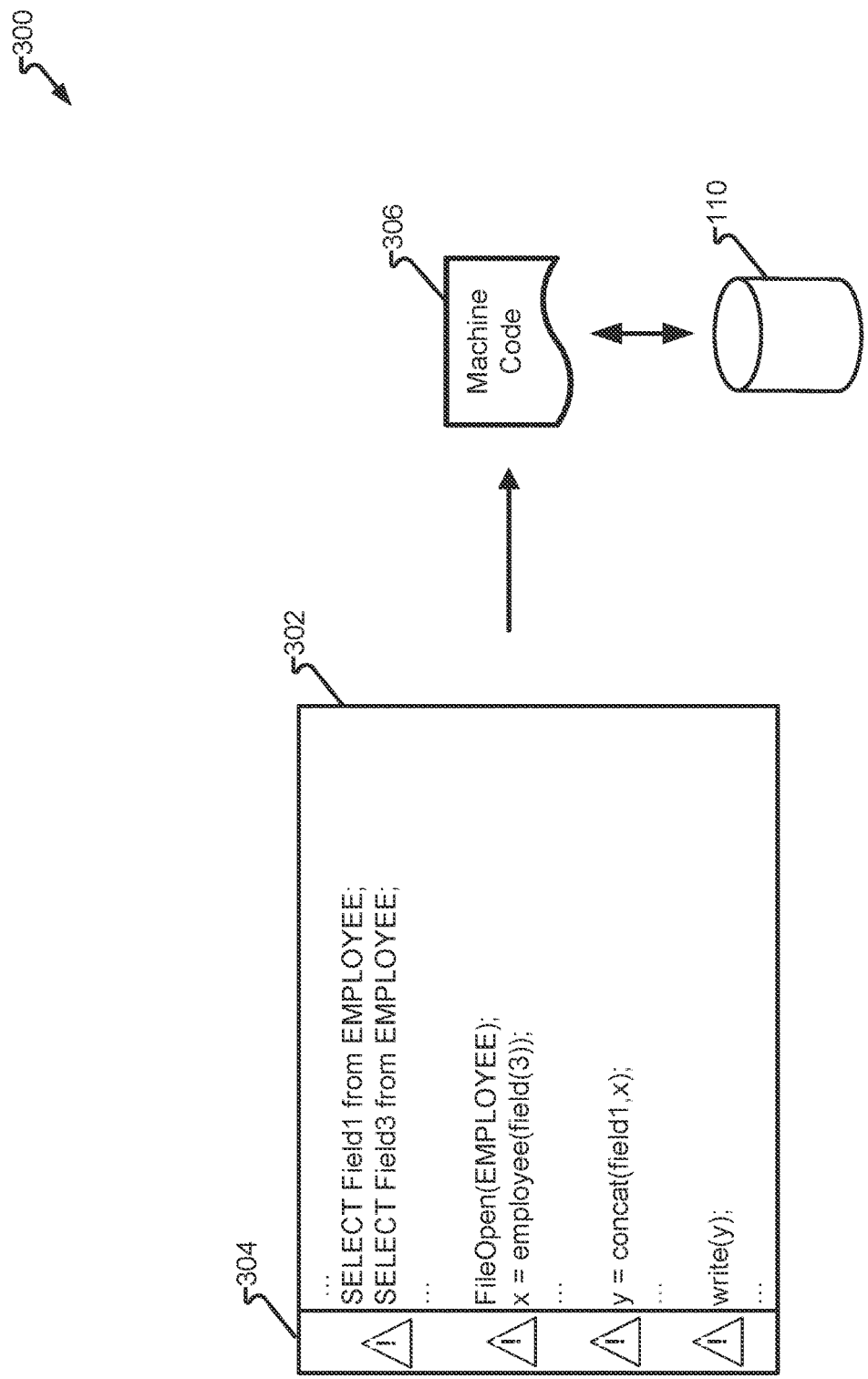
FIG. 3 depicts evaluation of an application under test in accordance with embodiments of the present disclosure.

FIG. 3 depicts evaluation 300 of an application under test in accordance with embodiments of the present disclosure. In one embodiment, evaluation 300 is performed by at least one processor of security analysis component 116 evaluating AUT 102 configured with rules, such as rules 220 (see FIG. 2) determined from a context-specific analysis of protected data storage 110. In one embodiment, source code 302 is an instance of AUT source code 104. In another embodiment, machine code 306 is an instance of AUT machine code 106, such as when machine code 306 is a machine executable form of source code 302.

In one embodiment, source code 302 is evaluated, such as with call graphs identifying the source (e.g., read, input), use, and sink (e.g., write, output) of sensitive data. Taint record 304 comprises taint flags identifying, optionally identifying particular locations within source code 302, where sensitive data is being accessed and at least one rule of rules 220 are evaluated as true. Results may then be reported (e.g., output to protected data storage 110). Notably, when no rule of rules 220 are evaluated is true, no marking is made in order to reduce false positives that would otherwise be reported.

In another embodiment, machine code 306 is evaluated dynamically (e.g., at runtime). Calls to protected data storage 110 that comprise sensitive data identified in at least one rule in rules 220 that is evaluated as true are then reported (e.g., output to results data storage 118).

Figure 4:
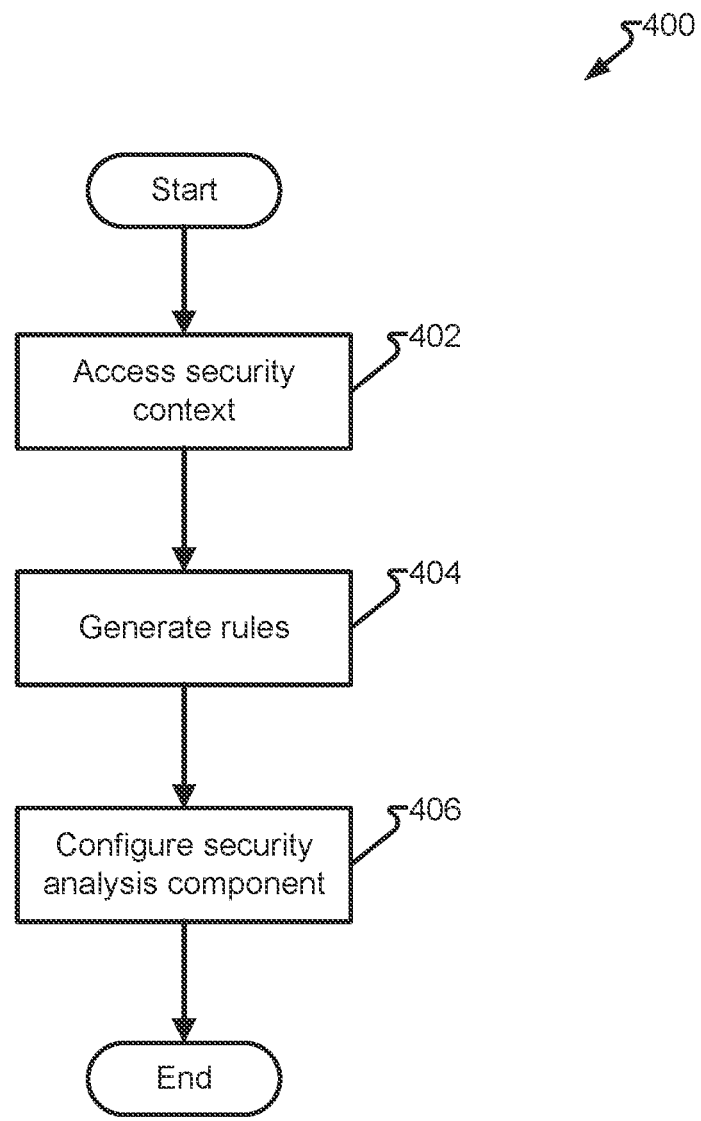
FIG. 4 depicts a process in accordance with embodiments of the present disclosure.

FIG. 4 depicts process 400 in accordance with embodiments of the present disclosure. In one embodiment, process 400 is embodied as machine-readable instructions that, when read by a machine, such as at least one processor of a computing device (e.g., rule generator 112 and/or security analysis component 116) causes the machine to perform the steps of process 400.

Process 400 begins and, in step 402, a context is accessed. The context defining at least one datum and/or particular operations on the at least one datum, of a superset of data, that is required to be secured in order to be in compliance with the context. The superset of data may comprise at least one different datum not required by the context to be secured.

Step 404 generates rules for the given context and the superset of data. The rules are then utilized to configure a security analysis component in step 406. The security analysis component may then perform a security analysis on a source code or a corresponding machine code and, evaluate whether the generated rules are true.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for automatically training a security analysis component to evaluate an application under test (AUT) for compliance with a security context, comprising:

at least one processor of a number of processors that accesses instructions maintained in a non-transitory memory, that, when executed by the at least one processor of the number of processors, cause the at least one processor of the number of processors to:

access the security context defining protected data, the protected data comprising one or more datum of a set of data;

generate a set of rules defining risks to the protected data, wherein the risks comprise usages of the protected data;

configure the security analysis component with the set of rules for testing the AUT for compliance with the security context; and in response to receiving a request for a requested datum of the set of data, the security analysis component selectively returns or declines the requested datum in accordance with evaluating the requested datum with the set of rules; and wherein the security analysis component performs tests on the AUT comprising identifying a call path utilizing the protected data, in accordance with the set of rules, and wherein the call path defines steps in the AUT and the AUT comprises source code; and wherein the call path that accesses the protected data is marked with a taint flag and wherein the taint flag is assigned to all subsequent manipulations originating from the protected data.

2. The system of claim 1, wherein at least one rule of the set of rules defines a risk comprising one or more of reading, writing, or manipulating the protected data.

3. The system of claim 1, wherein the set of rules define risks to the protected data comprising less than all of the set of rules applicable to the protected data.

4. The system of claim 1, wherein the set of rules define risks to the protected data comprising less than all of the set of data.

5. The system of claim 1, wherein the set of rules defining risks to the protected data defines risks to the protected data comprising a first set of protected data, determined upon the security context having a first security context value, and the set of rules defining risks to the protected data defines risks to the protected data comprising a second set of protected data, determined upon the security context having a second security context value.

6. The system of claim 1, wherein the set of rules defining risks to the protected data is generated to comprise a first set of rules, determined upon the security context having a first security context value, and the set of rules defining risks to the protected data is generated to comprise a second set of rules, determined upon the security context having a second security context value.

7. The system of claim 1, wherein the security analysis component performs tests on the AUT comprising testing the AUT, and wherein the AUT is embodied as executable machine code, for at least one of inputs or outputs of the protected data in accordance with the set of rules.

8. The system of claim 1, wherein the security context comprises one or more requirements of the Health Information Portability Act (HIPAA).

9. The system of claim 1, wherein the security context comprises one or more requirements associated with data records comprising both sensitive data and non-sensitive data.

10. A computer-based method for automatically training a security analysis component to evaluate an application under test (AUT) for compliance with a security context, comprising:

accessing the security context defining protected data, the protected data comprising one or more datum of a set of data;

generating a set of rules defining risks to the protected data, wherein the risks comprise usages of the protected data;

configuring the security analysis component with the set of rules for testing the AUT for compliance with the security context;

in response to receiving a request for a requested datum of the set of data, the security analysis component selectively returns or declines the requested datum in accordance with evaluating the requested datum with the set of rules;

performing, by the security analysis component, tests on the AUT comprising identifying a call path utilizing the protected data, in accordance with the set of rules, wherein the call path defines steps in the AUT and the AUT comprises source code; and marking, by the security analysis component, a subsequent manipulation of the protected data in the call path.

11. The method of claim 10, wherein at least one rule of the set of rules defines a risk comprising one or more of reading, writing, or manipulating the protected data.

12. The method of claim 10, wherein the set of rules define risks to the protected data comprising less than all of the set of rules applicable to the protected data.

13. The method of claim 10, wherein the set of rules define risks to the protected data comprising less than all of the set of data.

14. The method of claim 10, wherein the set of rules defining risks to the protected data defines risks to the protected data comprising a first set of protected data, determined upon the security context having a first security context value, and the set of rules defining risks to the protected data defines risks to the protected data comprising a second set of protected data, determined upon the security context having a second security context value.

15. The method of claim 10, wherein the set of rules defining risks to the protected data is generated to comprise a first set of rules, determined upon the security context having a first security context value, and the set of rules defining risks to the protected data is generated to comprise a second set of rules, determined upon the security context having a second security context value.

16. The method of claim 10, further comprising performing, by the security analysis component, tests on the AUT comprising testing the AUT, wherein the AUT is embodied as executable machine code, for at least one of inputs or outputs of the protected data in accordance with the set of rules.

17. The method of claim 10, wherein the security context comprises one or more requirements of the Health Information Portability Act (HIPAA).

18. The method of claim 10, wherein the security context comprises one or more requirements associated with data records comprising both sensitive data and non-sensitive data.

19. A system, comprising:

means to access a security context defining protected data, the protected data comprising one or more datum of a set of data;

means to generate a set of rules defining risks to the protected data, wherein the risks comprise usages of the protected data, wherein at least one rule of the set of rules defines a risk comprising one or more of reading, writing, or manipulating the protected data and wherein the set of rules define risks to the protected data comprising less than all of the set of rules applicable to the protected data;

means to configure a security analysis component with the set of rules for testing an application under test (AUT) for compliance with the security context;

means to, in response to receiving a request for a requested datum of the set of data, selectively returns or decline the requested datum in accordance with evaluating the requested datum with the set of rules;

means to perform, by the security analysis component, tests on the AUT comprising identifying a call path utilizing the protected data, in accordance with the set of rules, wherein the call path defines steps in the AUT and the AUT comprises source code; and means to mark, by the security analysis component, a subsequent manipulation of the protected data in the call path.

20. The system of claim 19, wherein:

at least one rule of the set of rules defines a risk comprising one or more of reading, writing, or manipulating the protected data; and the set of rules define risks to the protected data comprising less than all of the set of rules applicable to the protected data; and wherein the set of rules define risks to the protected data comprising less than all of the set of data.

\* \* \* \* \*